United States Patent [19]
Cox et al.

[11] 4,086,000
[45] Apr. 25, 1978

[54] VIEWFINDER OPTICS WITH ZERO POWER DOUBLET

[75] Inventors: Arthur Cox, Park Ridge; Walter R. Linke, Chicago, both of Ill.

[73] Assignee: Bell & Howell Company, Chicago, Ill.

[21] Appl. No.: 716,626

[22] Filed: Aug. 23, 1976

[51] Int. Cl.² .............................................. G02B 23/14
[52] U.S. Cl. ....................................... 350/54; 350/189
[58] Field of Search ............................. 350/45, 54, 189

[56] References Cited
U.S. PATENT DOCUMENTS 2,872,845  2/1959  Baker ................................ 350/215 X

FOREIGN PATENT DOCUMENTS 3,060 of  1909  United Kingdom ................... 350/54

Primary Examiner—John K. Corbin
Assistant Examiner—Matthew W. Koren
Attorney, Agent, or Firm—Roger M. Fitz-Gerald; John E. Peele, Jr.; Harold V. Stotland

[57] ABSTRACT

A chromatically neutral viewfinder optical system of positive forward and rearward elements and including therebetween a substantially zero power doublet which neutralizes chromatic errors generated by the positive elements.

6 Claims, 36 Drawing Figures

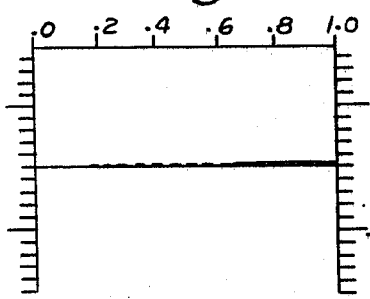
Fig. 2a.
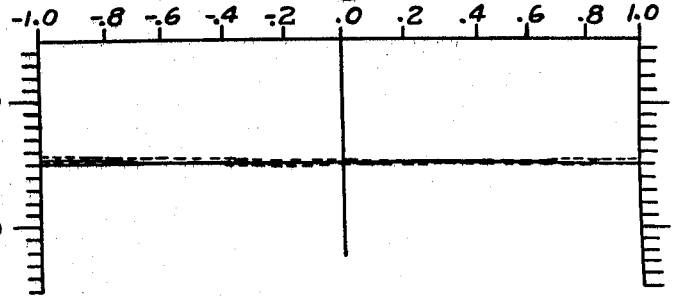
Fig. 2b.
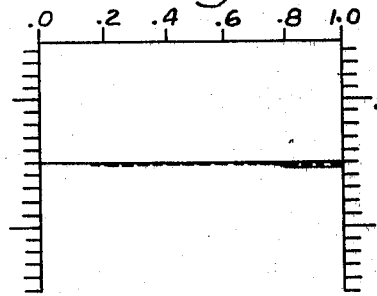
Fig. 2c.
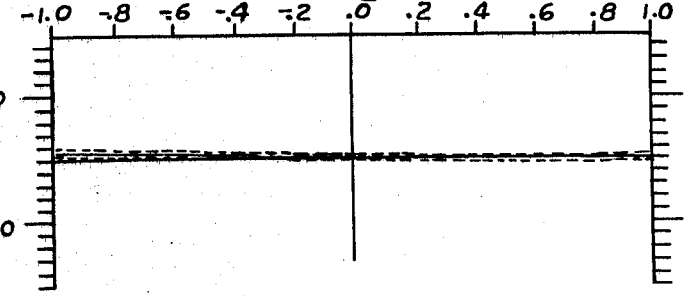
Fig. 2d.
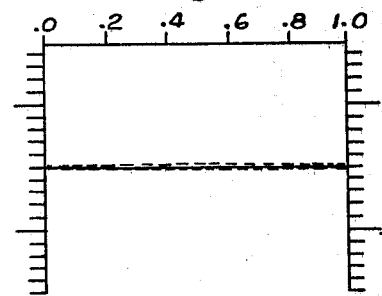
Fig. 2e.
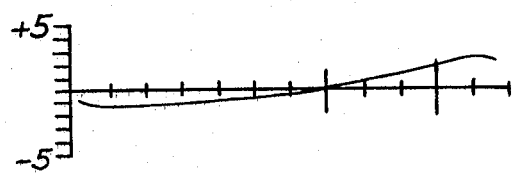
Fig. 2f.
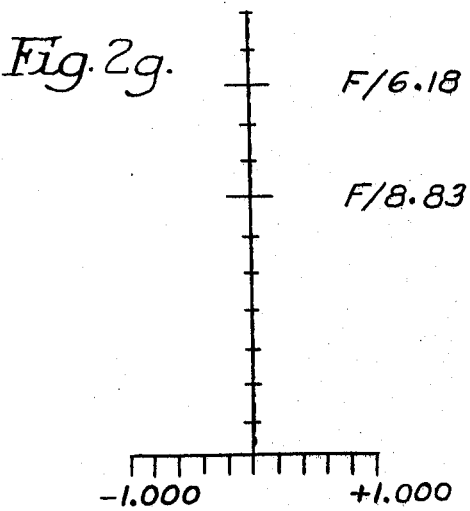
Fig. 2g.    F/6.18
F/8.83
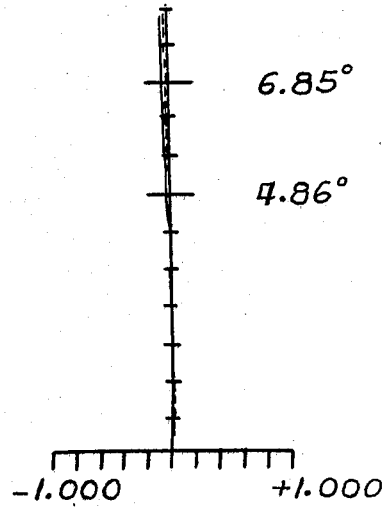
Fig. 2h.    6.85°
4.86°

F/3.88
F/5.54

7.71°
5.47°

F/4.30
F/6.14

6.96°
4.94°

F/6.09

F/8.70

7.39°

5.24°

VIEWFINDER OPTICS WITH ZERO POWER DOUBLET

This invention relates to an optical system for the viewfinder of an optical instrument providing for a high quality viewing image with a relatively small number of elements.

Optical systems for viewfinders of optical instruments such as cameras are well known. Generally, viewfinders providing high quality images are available only on the more expensive optical instruments, in which the added cost of the more complex optical systems is less apparent. Particularly, the viewfinder optical systems of more expensive instruments often include 10 to 14 optical elements. Obviously, the larger the number of elements, the more costly is the particular system. Hence, to justify the significant increase in cost to provide the higher quality design, other components of the instrument or optical system must likewise be upgraded adding further to the total cost of the instrument.

Other designs of viewfinder optical systems have been provided with relatively few elements, and hence relatively low cost. However, these optical system designs have inherent deficiencies which provide satisfactory, although lower quality images. Even though the remaining optical components may be of high quality, the image is degraded substantially to the extent of the least effective design component.

A relatively low cost viewfinder optical system providing a high quality image is described hereinafter. The system incorporates all positive plastic elements plus a substantially zero power doublet which corrects for chromatic aberrations. In a preferred embodiment, four positive elements are used, plus the doublet. The resulting image quality is deemed to be comparable to that of viewfinder systems having 12–16 elements. The zero power doublet is a hyperchromatic component which introduces a chromatic aberration opposite to the chromatic aberration of the remainder of the optical system. This effect reduces the number of elements required for comparable correction in a more conventional optical design. That is, in known system designs, chromatic aberration is corrected by selecting different optical materials of varying dispersions and making selected elements of these optical materials of opposite powers, i.e. positive and negative elements. Alternatively, the optical materials may be either glass or plastic, and the resulting doublet may have the elements in contact one with the other or the elements may be slightly air-spaced. However, by using the substantially zero power doublet to correct the chromatic aberration, the additional pairs of positive and negative elements are avoided, enabling the use in addition to the doublet, of all positive elements while obtaining a high quality image with relatively low cost optics.

Other objects and advantages of the invention will become apparent from the detailed description which follows when taken in conjunction with the accompanying drawings in which:

FIGS. 2a to 2h are graphical representations of the various aberrations of the optical system shown in FIG. 1 and having the design data given in Table 1.

Figure 1:
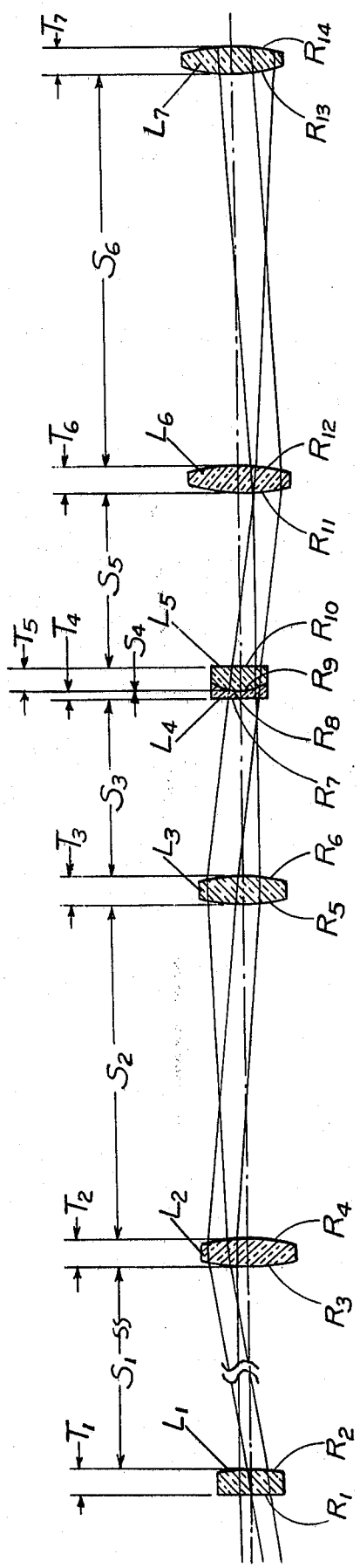
FIG. 1 is a diagrammatic sectional view of a preferred optical system according to the present invention.

As seen in FIGS. 1, 3, 5, and 7 an optical system is shown for use as a viewfinder of an optical instrument such as a camera. The arrangement of the elements, configured as hereinafter described, provides for a positive image of a scene being viewed. The image is highly corrected and is essentially chromatically neutral. Primarily, the optical system is intended for a reflex viewing system in which the light rays from a scene enter by a main optical system or at least the zoom portion of a variable focal length objective lens of a camera. The light rays pass through the objective lens which functions as a relay component, and by known reflecting or semi-reflecting components, the image is relayed from the objective lens to the viewfinder optics.

Beyond the image reflecting component, such as a peek-in-mirror, the optical system, in addition to the doublet, may have four or five elements, some of which may have aspheric surfaces. In the embodiment shown in FIG. 1, the first element $L_1$, with an aspheric surface, projects the image to a forward set of elements, being respectively a field lens $L_2$ and a first erector lens $L_3$. The doublet of elements $L_4$ and $L_5$ receives the light rays and images same on the rearward set of elements, being respectively a second erector lens $L_6$ and an eyepiece lens $L_7$. Each of the elements are molded of plastic material, such as methyl methacrylate.

Between the forward and rearward sets of elements, and located substantially at the position of the aperture stop of the system is a substantially zero power doublet, which may be formed of glass or other optical material, such as the aforementioned or other plastic material. As the light rays exit from the first erector lens element, $L_3$, of the forward set of elements, a degree of chromatic aberration is introduced. In that the zero power doublet is selected to provide a reverse or opposing chromatic aberration for the elements in the forward and rearward sets of elements, chromatic aberration introduced in the system by the positive elements of the first set is overcorrected for. As the light rays emerge from the zero power doublet, and enter the rearward set of elements, correction of the remaining chromatic aberration is made, as the latter elements serve to return to neutral the correction required.

Within the optical system, the elements are spaced such that the light rays form an image at an image plane between the objective lens $L_1$ and the field lens $L_2$. The aperture stop of the system is between the first erector $L_3$ and the second erector lens $L_6$ and an eyepiece lens $L_7$. The eyepiece lens $L_7$ is supported in an adjustable member (not shown) to permit required adjustments to accommodate for variations due to the eyes of particular users. By a selected construction of the eyepiece lens support, the user's eye is maintained a minimum distance away from the eyepiece lens for efficient imaging of the scene as seen through the forward portion of the main optical system, which scene image is correspondingly imaged by the prime lens (not shown) of the optical instrument.

The optical values for the optical system of FIG. 1 are as follows:

TABLE 1

| Lens | Radii | Dimensions in Inches | | $N_D$ | V |
|------|-------|-----------|---------|-------|-----|
|      |       | Thickness | Spacing |       |     |
| $L_1$ | $R_1$=*R(1)<br>$R_2$=.6940 | $T_1$=.1200 |  | 1.490 | 57.4 |
|      |       |           | $S_1$=1.4220 |       |     |
| $L_2$ | $R_3$=2.8570<br>$R_4$=1.6140 | $T_2$=.1400 |  | 1.518 | 59.0 |
|      |       |           | $S_2$=.4500 |       |     |
| $L_3$ | $R_5$=.8320<br>$R_6$=*R(2) | $T_3$=.1700 |  | 1.490 | 57.4 |
|      |       |           | $S_3$=.6773 |       |     |
| $L_4$ | $R_7$=4.7230<br>$R_8$=−0.1898 | $T_4$=.0300 |  | 1.720 | 29.3 |
|      |       |           | $S_4$=0 |       |     |
| $L_5$ | $R_9$=.1898<br>$R_{10}$=INF | $T_5$=.1000 |  | 1.691 | 54.8 |
|      |       |           | $S_5$=.4430 |       |     |
| $L_6$ | $R_{11}$=*R(3)<br>$R_{12}$=.5896 | $T_6$=.2000 |  | 1.490 | 57.4 |
|      |       |           | $S_6$=1.3840 |       |     |
| $L_7$ | $R_{13}$=.7000<br>$R_{14}$=*R(4) | $T_7$=.1850 |  | 1.490 | 57.4 |

In all of the tables, the first column lists the lens elements of the viewfinder lens system numerically starting at the ray entrance side of the system. The second column lists the respective radii and the vertex radii of the aspheric surfaces *$R_1$, *$R_2$, *$R_3$, and *$R_4$ et cetera. In all of the tables the positive and negative signs giving the respective radii follow the "lensmaker's convention", to facilitate fabrication of the individual lens elements, wherein convex surfaces are positive and concave surfaces are negative. The aspheric term is derived by the formula $$Z_1 = (K(H^2 - Z_o^2) + (AH^4 + BH^6 + CH^8 + OH^{10}))/(2(1 - KZ_o))$$

In the formula, constants are:

| Aspheric Radius | K | A | B | C |
|-----------------|---|---|---|---|
| *R(1) 2.23564 | 0.44730 | −0.50000 | 0.14405×10¹ | −41 10¹ |
| *R(2) 1.08050 | 0.92550 | −0.85000 | 0.17000×10¹ | 0.30000×10¹ |
| *R(3) 0.78125 | 1.28000 | −0.90000 | −0.85000×10¹ |  |
| *R(4) 0.81433 | 1.22800 | −0.16500×10¹ | 0.84000×10¹ | −0.35000×10² | where 1/K is the vertex radius of the curvature of the surface of the element; H is the Cartesian coordinate of a point on the surface referred in a vertical axis; Z is the Cartesian coordinate of a point on the surface referred in a horizontal axis. The third column lists the thicknesses of the respective elements. The fourth column lists the axial spacings between the respective elements and the minimum spacing to the user's eye. The fourth and fifth columns list the respective refractive indices ($N_D$) and dispersive indices (V) of the elements.

FIGS. 2a to 2h graphically represent various aberrations related to the viewfinder optical system as shown in FIG. 1 and having the design data recited in Table 1. FIG. 2a represents axial chromatic correction of three typical wavelengths forming rays on axis and lateral. FIG. 2b represents off axis aberrations of a ray passing from the zone of the film format and through the lens transversely and tangentially. FIG. 2c represents the aberrations of the rays passing from the corner of the film format through the lens tangentially and transversely. FIG. 2d represents the radial or longitudinal aberration from the zone of the film format of rays entering the lens at 5 o'clock, while FIG. 2e represents similar aberrations from full field or corner rays. FIG. 2f represents distortion as a percentage of a "perfect" image. FIG. 2g represents the spherical aberration by a full line and the offense-against-sine-condition by the dotted line. FIG. 2h represents the curvature of field with tangential curvature being shown in full line and sagittal curvature being shown in dashed line.

Figure 3:
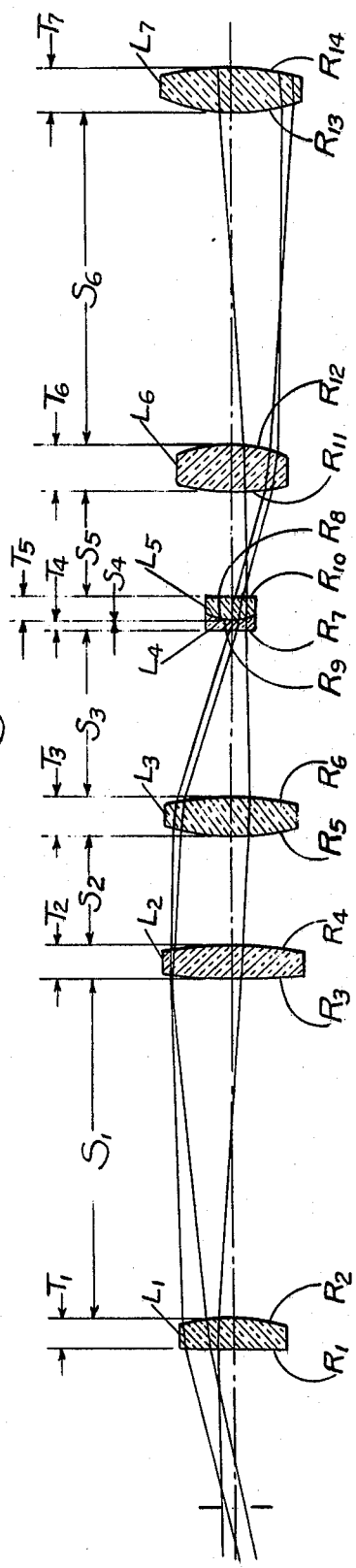
FIG. 3 is a diagrammatic sectional view of another embodiment of an optical system according to the present invention.

The optical values for the optical system of FIG. 3 are quite similar to those set forth with respect to FIG. 1, and are defined with respect to the values in the optical system of FIG. 1 – Table 1. The resulting optical corrections and aberrations are similar to the optical characteristics set forth in the graphs of FIGS. 4a to 4h.

Figure 5:
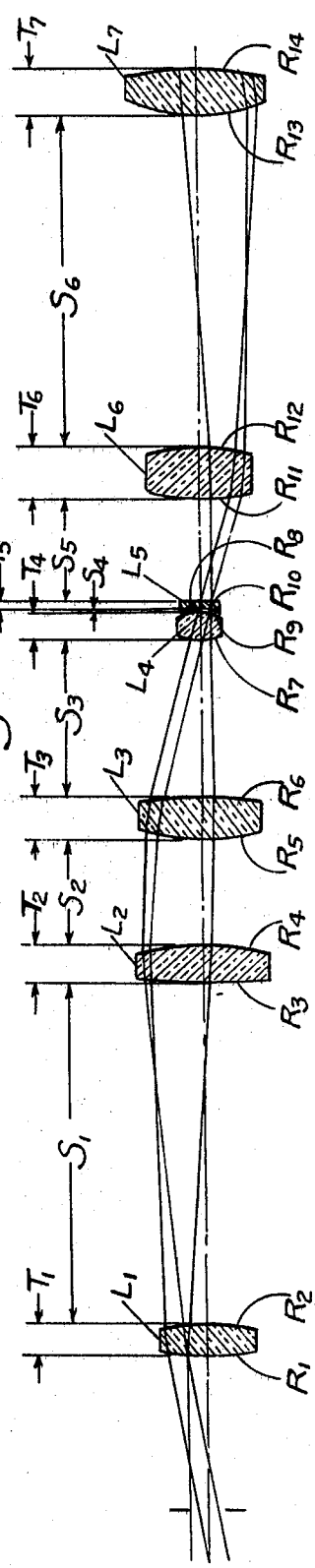
FIG. 5 is a diagrammatic sectional view of still another embodiment of an optical system according to the present invention.

The values for the optical system of FIG. 5 are set forth below in Table 2 with the values corresponding to those as defined with respect to the values in the optical system of FIG. 1 – Table 1. The substantially chromatically zero power doublet in this system is shown to have the components thereof slightly air spaced one from another.

TABLE 2

| Lens | Radii | dimensions in Inches | | $N_D$ | V |
|------|-------|-----------|---------|-------|-----|
|      |       | Thickness | Spacing |       |     |
| $L_1$ | $R_1$=*R(1)<br>$R_2$=.6940 | $T_1$=.1200 |  | 1.490 | 57.4 |
|      |       |           | $S_1$=1.4220 |       |     |
| $L_2$ | $R_3$=2.8570<br>$R_4$=1.6140 | $T_2$=.1400 |  | 1.518 | 59.0 |
|      |       |           | $S_2$=.4500 |       |     |
| $L_3$ | $R_5$=.8320<br>$R_6$=*R(2) | $T_3$=.1700 |  | 1.490 | 57.4 |
|      |       |           | $S_3$=.6673 |       |     |
| $L_4$ | $R_7$=*R(3)<br>$R_8$=.1820 | $T_4$=.1100 |  | 1.490 | 57.4 |
|      |       |           | $S_4$=.0050 |       |     |
| $L_5$ | $R_9$=−.1820<br>$R_{10}$=−1.2821 | $T_5$=.0300 |  | 1.592 | 30.4 |
|      |       |           | $S_5$=.4430 |       |     |
| $L_6$ | $R_{11}$=*R(4)<br>$R_{12}$=.5896 | $T_6$=.2000 |  | 1.490 | 57.4 |
|      |       |           | $S_6$=1.4840 |       |     |
| $L_7$ | $R_{13}$=.7000<br>$R_{14}$=*R(5) | $T_7$=.1850 |  | 1.490 | 57.4 |

In the aspheric formula for the optical system of Table 2, the constants are:

| Aspheric Radius | K | A | B | C |
|-----------------|---|---|---|---|
| *R(1) 2.23564 | 0.44730 | −0.50000 | 0.14405×10¹ | −0.10000×10¹ |
| *R(2) 1.08050 | 0.92550 | −0.85000 | 0.17000×10¹ | 0.30000×b10¹ |

-continued

| Aspheric Radius | K | A | B | C |
|---|---|---|---|---|
| *R(3) 0.57143 | 1.75000 | $0.29312 \times 10^1$ | | |
| R*(4) 0.78125 | 1.28000 | $-0.90000$ | $-0.85000 \times 10^1$ | |
| *R(5) 0.81433 | 1.22800 | $-0.16500 \times 10^1$ | $0.84000 \times 10^1$ | $-0.35000 \times 10^2$ |

FIGS. 4a to 4h are graphs representative of the various aberrations for the optical system in FIG. 3, the graphs being defined as set forth with respect to FIGS. 2a to 2h.

Figure 7:
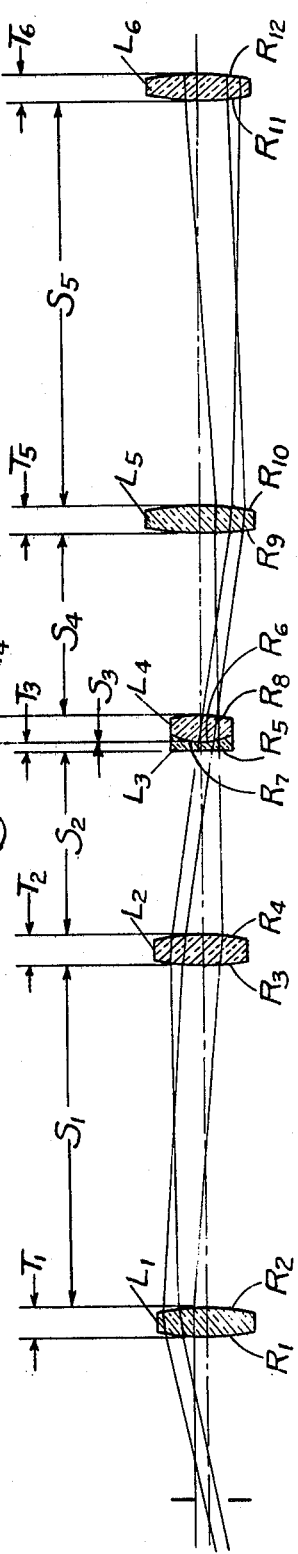
FIG. 7 is a diagrammatic sectional view of yet another embodiment of an optical system according to the present invention.
Figure 4A:
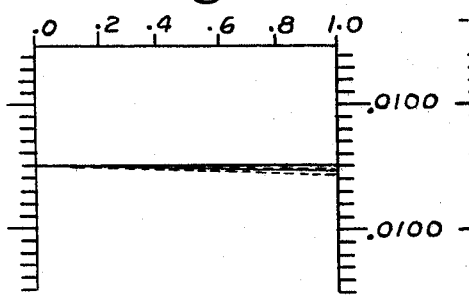
FIGS. 4a to 4h are graphical representations of the various aberrations of the optical system shown in FIG. 3 and also having the design data of Table 1.
Figure 4B:
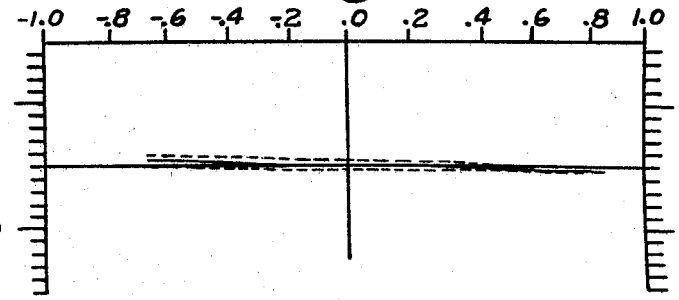
Figure 4C:
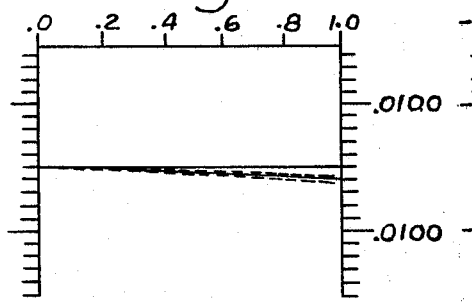
Figure 4D:
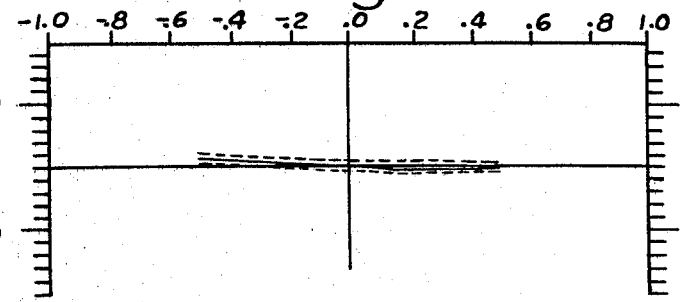
Figure 4E:
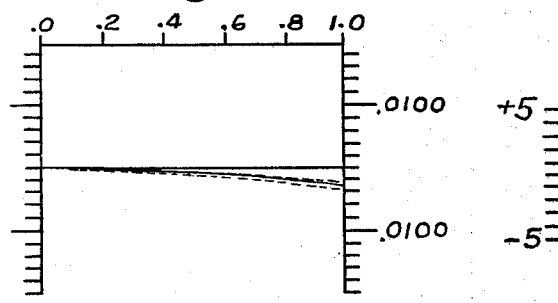
Figure 4F:
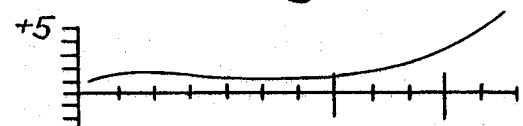
Figure 4G:
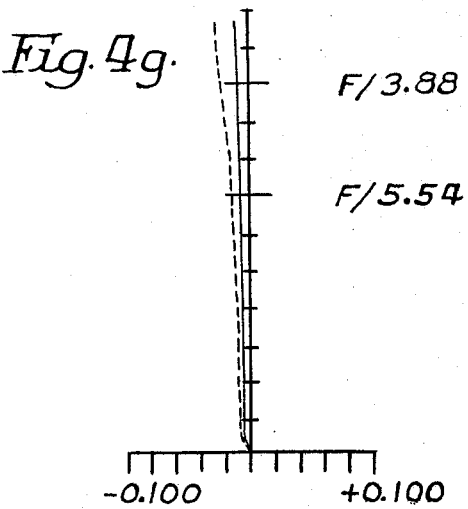
Figure 4H:
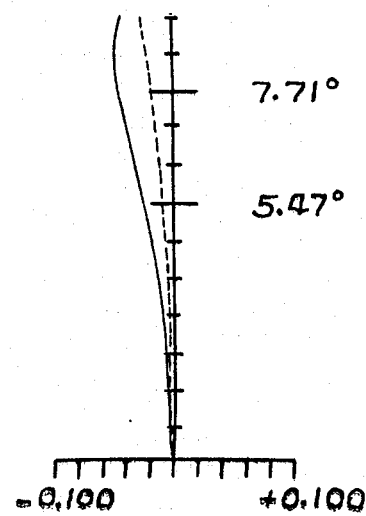
Figure 6A:
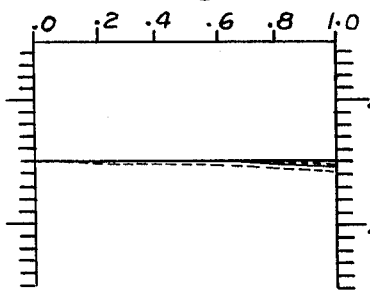
FIGS. 6a to 6h are graphical representations of the various aberrations of the optical system shown in FIG. 5 and having the design data of Table 2.
Figure 6B:
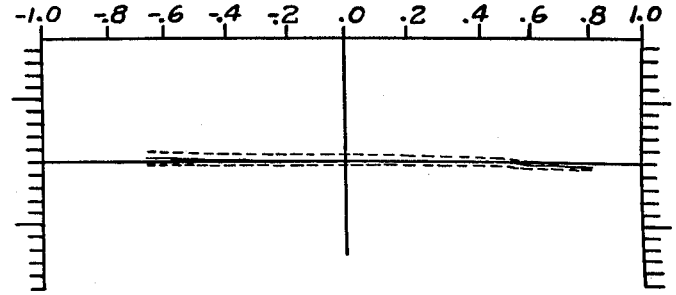
Figure 6C:
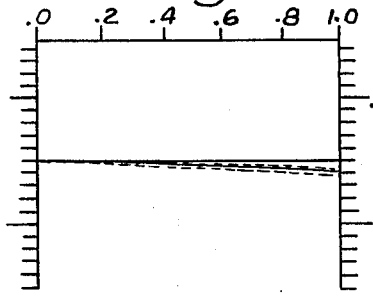
Figure 6D:
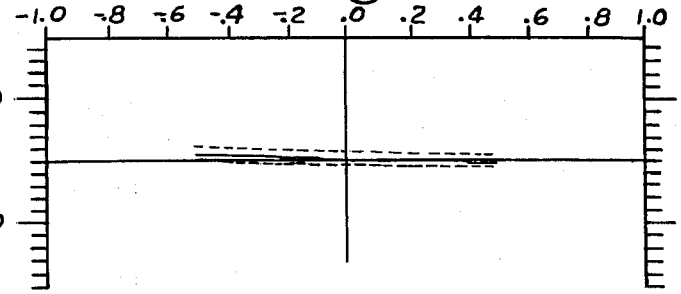
Figure 6E:
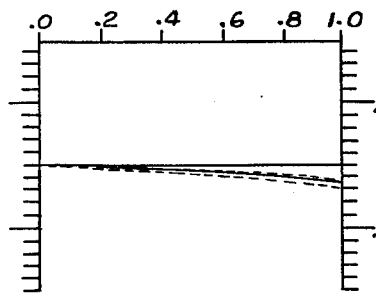
Figure 6F:
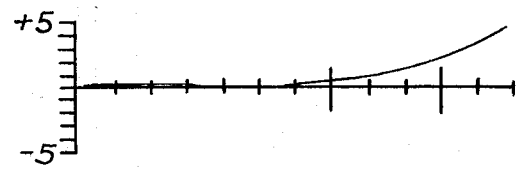
Figure 6G:
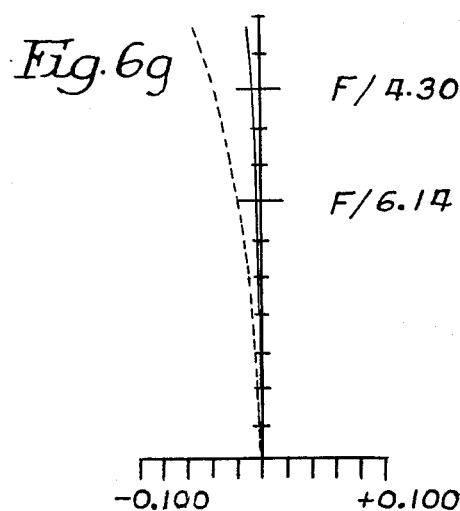
Figure 6H:
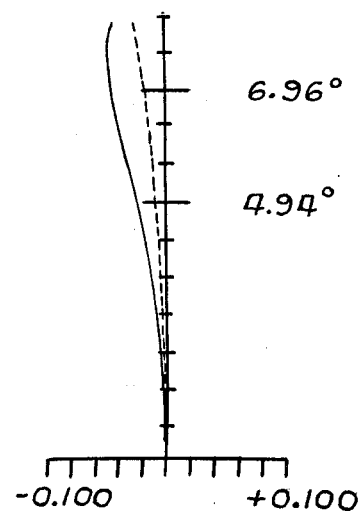
Figure 8A:
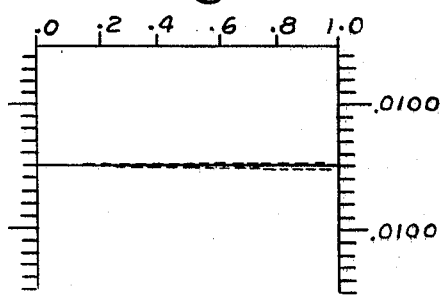
FIGS. 8a to 8h are graphical representations of the various aberrations of the optical system shown in FIG. 7 and having the design data of Table 3.
Figure 8B:
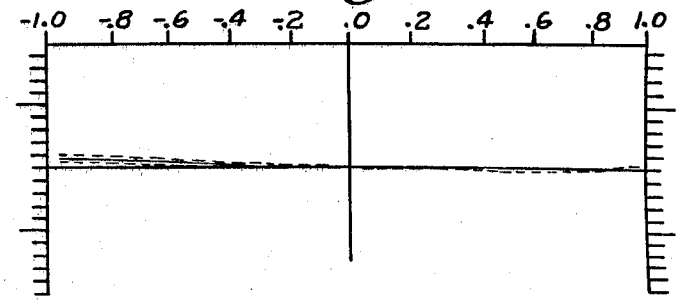
Figure 8C:
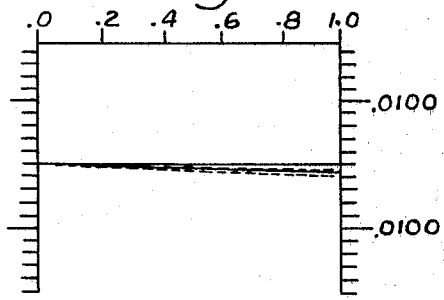
Figure 8D:
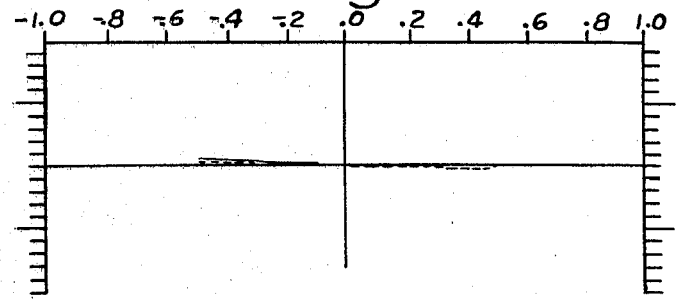
Figure 8E:
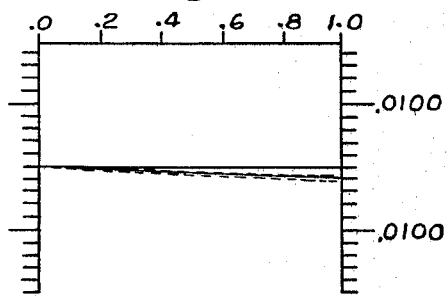
Figure 8F:
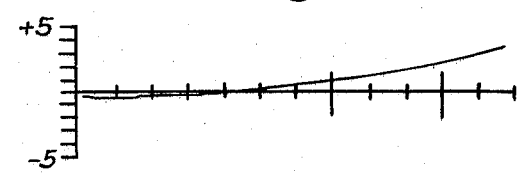
Figure 8G:
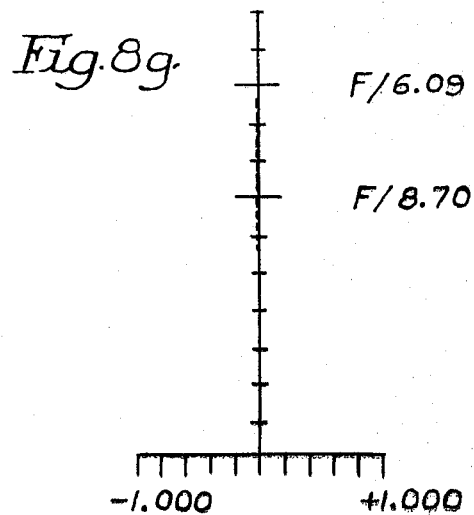
Figure 8H:
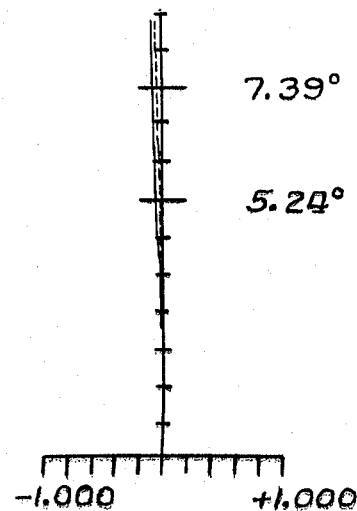

For the optical system of FIG. 7, the values corresponding to those defined in the optical system of FIG. 1 – Table 1 are:

TABLE 3

| Lens | Radii | Dimensions in Inches Thickness | Spacing | $N_D$ | V |
|---|---|---|---|---|---|
| $L_1$ | $R_1 = *R(1)$ $R_2 = *R(2)$ | $T_1 = .1200$ | | 1.490 | 57.4 |
| | | | $S_1 = 1.4020$ | | |
| $L_2$ | $R_3 = *R(3)$ $R_4 = *R(4)$ | $T_2 = .1200$ | | 1.490 | 57.4 |
| | | | $S_2 = .7520$ | | |
| $L_3$ | $R_5 = 5.0000$ $R_6 = -.1763$ | $T_3 = .0300$ | | 1.592 | 30.4 |
| | | | $S_3 = 0$ | | |
| $L_4$ | $R_7 = .1763$ $R_8 = *R(5)$ | $T_4 = .1000$ | | 1.490 | 57.4 |
| | | | $S_4 = .7500$ | | |
| $L_5$ | $R_9 = *R(6)$ $R_{10} = *R(7)$ | $T_5 = .1100$ | | 1.490 | 57.4 |
| | | | $S_5 = 1.6555$ | | |
| $L_6$ | $R_{11} = *R(8)$ $R_{12} = *R(9)$ | $T_6 = .1100$ | | 1.490 | 57.4 |

In the aspheric formula for the optical system of Table 3, the constants are:

| Aspheric Radius | K | A | B | C |
|---|---|---|---|---|
| *R(1) 0.60870 | 1.64284 | $-0.10000 \times 10^1$ | | |
| *R(2) 0.60671 | 1.64824 | $-0.10000 \times 10^1$ | | |
| *R(3) 0.80700 | 1.23916 | $-0.40500$ | | |
| *R(4) 0.80700 | 1.23916 | $-0.40500$ | | |
| *R(5) 1.11474 | 0.89707 | $0.49350 \times 10^1$ | $-0.21500 \times 10^3$ | $0.13000 \times 10^5$ |
| *R(6) 0.96446 | 1.03685 | $-0.20000$ | | |
| *R(7) 0.96446 | 1.03685 | $-0.20000$ | | |
| *R(8) 0.70700 | 1.41443 | $-0.67500$ | | |
| *R(9) 0.70700 | 1.41443 | $-0.67500$ | | |

FIGS. 6a to 6h are graphs representative of the various aberrations for the optical system in FIG. 5, the graphs being defined as set forth with respect to FIGS. 2a to 2h.

For the optical system of FIG. 7, the values corresponding to those defined in the optical system of FIG. 1 – Table 1 are:

TABLE 4

| Lens | Radii | Dimensions in Inches Thickness | Spacing | $N_D$ | V |
|---|---|---|---|---|---|
| $L_1$ | $R_1 = *R(1)$ $R_2 = *R(2)$ | $T_1 = .1200$ | | 1.490 | 57.4 |
| | | | $S_1 = 1.4020$ | | |
| $L_2$ | $R_3 = *R(3)$ $R_4 = *R(4)$ | $T_2 = .1200$ | | 1.490 | 57.4 |
| | | | $S_2 = .7520$ | | |
| $L_3$ | $R_5 = 4.7230$ $R_6 = .1898$ | $T_3 = .0300$ | | 1.720 | 29.3 |
| | | | $S_3 = 0$ | | |
| $L_4$ | $R_7 = .1898$ $R_8 = INF$ | $T_4 = .1000$ | | 1.691 | 54.8 |
| | | | $S_4 = .7500$ | | |
| $L_5$ | $R_9 = *R(5)$ $R_{10} = *R(6)$ | $T_5 = .1100$ | | 1.490 | 57.4 |
| | | | $S_5 = 1.6555$ | | |
| $L_6$ | $R_{11} = *R(7)$ $R_{12} = *R(8)$ | $T_6 = .1100$ | | 1.490 | 57.4 |

In the aspheric formula for the optical system of Table 4, the constants are:

| Aspheric Radius | K | A |
|---|---|---|
| *R(1) 0.60870 | 1.64284 | $-0.10000 \times 10^1$ |
| *R(2) 0.60671 | 1.64824 | $-0.10000 \times 10^1$ |
| *R(3) 0.80700 | 1.23916 | $-0.40500$ |
| *R(4) 0.80700 | 1.23916 | $-0.40500$ |
| *R(5) 0.96446 | 1.03685 | $-0.20000$ |
| *R(6) 0.96446 | 1.03685 | $-0.20000$ |
| *R(7) 0.70700 | 1.41443 | $-0.67500$ |
| *R(8) 0.70700 | 1.41443 | $-0.674500$ |

FIGS. 8a to 8h are graphs representative of the various aberrations for the optical system in FIG. 7, the graphs being defined as set forth with respect to FIGS. 2a to 2h.

Optical values of another optical system are set forth below in Table 5. Since the optical layouts are substantially the same as those shown in FIG. 7, additional layouts are considered unnecessary. Also since the aberrations are quite similar in class and degree, additional graphs are deemed to be excessive.

TABLE 5

| Lens | Radii | Dimensions in Inches Thickness | Spacing | $N_D$ | V |
|---|---|---|---|---|---|
| $L_1$ | $R_1 = *R(1)$ $R_2 = *R(2)$ | $T_1 = .1200$ | | 1.490 | 57.4 |
| | | | $S_1 = 1.4020$ | | |
| $L_2$ | $R_3 = *R(3)$ $R_4 = *R(4)$ | $T_2 = .1200$ | | 1.490 | 57.4 |
| | | | $S_2 = .7520$ | | |
| $L_3$ | $R_5 = 5.0000$ $R_6 = 0.1763$ | $T_3 = .0300$ | | 1.592 | 30.4 |
| | | | $S_3 = .0050$ | | |
| $L_4$ | $R_7 = .1763$ $R_8 = *R(5)$ | $T_4 = .1000$ | | 1.490 | 57.4 |
| | | | $S_4 = .7500$ | | |
| $L_5$ | $R_9 = *R(6)$ $R_{10} = *R(7)$ | $T_5 = .1100$ | | 1.490 | 57.4 |
| | | | $S_5 = 1.6555$ | | |
| $L_6$ | $R_{11} = *R(8)$ $R_{12} = *R(9)$ | $T_6 = .1100$ | | 1.490 | 57.4 |

In the aspheric formula for the optical system of Table 5, the constants are:

| Aspheric Radius | K | A | B | C |
|---|---|---|---|---|
| *R(1) 0.60870 | 1.64284 | $-0.10000 \times 10^1$ | | |
| *R(2) 0.60671 | 1.64824 | $-0.10000 \times 10^1$ | | |
| *R(3) 0.80700 | 1.23916 | $-0.40500$ | | |
| *R(4) 0.80700 | 1.23916 | $-0.40500$ | | |
| *R(5) 1.26582 | 0.79000 | $0.49350 \times 10^1$ | $-0.21500 \times 10^3$ | $-0.77000 \times 10^5$ |
| *R(6) 0.96446 | 1.03685 | $-0.20000$ | | |
| *R(7) 0.96446 | 1.03685 | $-0.20000$ | | |
| *R(8) 0.70700 | 1.41443 | $-0.67500$ | | |
| *R(9) 0.70700 | 1.41443 | $-0.67500$ | | |

What is claimed is:

1. An optical system of a chromatically neutral viewfinder system, the system having:
    an aperture stop;
    positive elements spaced forward of said aperture stop;
    positive elements spaced rearward of said forward elements and said aperture stop, the rearward elements including an eyepiece element; and
    every one of the elements forwardly and rearwardly of said aperture stop having convex surfaces, no element forwardly or rearwardly of said aperture stop having a concave surface,
    a hyperchromatic component which includes a chromatic aberration opposite to the chromatic aberration generated by said positive elements, the component being interposed along the optical axis substantially at the position of said aperture stop between said positive forward elements and said positive rearward elements
    whereby said component chromatically neutralizes the image.

2. An optical system of a chromatically neutral viewfinder system incorporating a substantially zero power doublet located near the position of an aperture stop in the system, the system having substantially the following specifications:

| Lens | Radii | Dimensions in Inches Thickness | Spacing | $N_D$ | V |
|---|---|---|---|---|---|
| $L_1$ | $R_1 = *R(1)$<br>$R_2 = .6940$ | $T_1 = .1200$ | | 1.490 | 57.4 |
| | | | $S_1 = 1.4220$ | | |
| $L_2$ | $R_3 = 2.8570$<br>$R_4 = 1.6140$ | $T_2 = .1400$ | | 1.518 | 59.0 |
| | | | $S_2 = .4500$ | | |
| $L_3$ | $R_5 = .8320$<br>$R_6 = *R(2)$ | $T_3 = .1700$ | | 1.490 | 57.4 |
| | | | $S_3 = .6773$ | | |
| $L_4$ | $R_7 = 4.7230$<br>$R_8 = -0.1898$ | $T_4 = .0300$ | | 1.720 | 29.3 |
| | | | $S_4 = 0$ | | |
| $L_5$ | $R_9 = .1898$<br>$R_{10} = INF$ | $T_5 = .1000$ | | 1.691 | 54.8 |
| | | | $S_5 = .4430$ | | |
| $L_6$ | $R_{11} = *R(3)$<br>$R_{12} = .5896$ | $T_6 = .2000$ | | 1.490 | 57.4 |
| | | | $S_6 = 1.3840$ | | |
| $L_7$ | $R_{13} = .7000$<br>$R_{14} = *R(4)$ | $T_7 = .1850$ | | 1.490 | 57.4 | wherein the first column lists the lens elements numerically starting at the ray entrance side of the system, the second column lists the respective radii and vertex radii of the aspheric surfaces *R(1) to *R(4), using the convention that the negative (−) values of the radii indicating surfaces which are concave and the positive (+) values of the radii indicating surfaces which are convex; and the third column lists the thicknesses $T_1$ to $T_7$ of the respective elements; the fourth column lists the axial spacings $S_1$ to $S_6$ between the respective elements, and the fifth and sixth columns list respectively the refractive index $N_D$ and the dispersive index V of the respective elements.

3. An optical system of a chromatically neutral viewfinder system incorporating a substantially zero power doublet located near the position of an aperture stop in the system, the system having substantially the following specifications:

| Lens | Radii | Dimensions in Inches Thickness | Spacing | $N_D$ | V |
|---|---|---|---|---|---|
| $L_1$ | $R_1 = *R(1)$<br>$R_2 = .6940$ | $T_1 = .1200$ | | 1.490 | 57.4 |
| | | | $S_1 = 1.4220$ | | |
| $L_2$ | $R_3 = 2.8570$<br>$R_4 = 1.6140$ | $T_2 = .1400$ | | 1.518 | 59.0 |
| | | | $S_2 = .4500$ | | |
| $L_3$ | $R_5 = .8320$<br>$R_6 = *R(2)$ | $T_3 = .1700$ | | 1.490 | 57.4 |
| | | | $S_3 = .6673$ | | |
| $L_4$ | $R_7 = *R(3)$<br>$R_8 = .1820$ | $T_4 = .1100$ | | 1.490 | 57.4 |
| | | | $S_4 = .0050$ | | |
| $L_5$ | $R_9 = .1820$<br>$R_{10} = -1.2821$ | $T_5 = .0300$ | | 1.592 | 30.4 |
| | | | $S_5 = .4430$ | | |
| $L_6$ | $R_{11} = *R(4)$<br>$R_{12} = .5896$ | $T_6 = .2000$ | | 1.490 | 57.4 |
| | | | $S_6 = 1.4840$ | | |
| $L_7$ | $R_{13} = .7000$<br>$R_{14} = *R(5)$ | $T_7 = .1850$ | | 1.490 | 57.4 | wherein the first column lists the lens elements numerically starting at the ray entrance side of the system, the second column lists the respective radii and vertex radii of the aspheric surfaces *R(1) to *R(5), using the convention that the negative (−) values of the radii indicating surfaces which are concave and the positive (+) values of the radii indicating surfaces which are convex; the third column lists the thicknesses $T_1$ to $T_7$ of the respective elements; the fourth column lists the axial spacings $S_1$ to $S_6$ between the respective elements, and the fifth and sixth columns lists respectively the refractive index $N_D$ and the dispersive index V of the respective elements.

4. An optical system of a chromatically neutral viewfinder system incorporating a substantially zero power doublet located near the position of an aperture stop in the system, the system having substantially the following specifications:

| Lens | Radii | Dimensions in Inches Thickness | Spacing | $N_D$ | V |
|---|---|---|---|---|---|
| $L_1$ | $R_1 = *R(1)$<br>$R_2 = *R(2)$ | $T_1 = .1200$ | | 1.490 | 57.4 |
| | | | $S_1 = 1.4020$ | | |
| $L_2$ | $R_3 = *R(3)$<br>$R_4 = *R(4)$ | $T_2 = .1200$ | | 1.490 | 57.4 |
| | | | $S_2 = .7520$ | | |
| $L_3$ | $R_5 = 5.0000$<br>$R_6 = -.1763$ | $T_3 = .0300$ | | 1.592 | 30.4 |
| | | | $S_3 = 0$ | | |
| $L_4$ | $R_7 = .1763$ | $T_4 = .1000$ | | 1.490 | 57.4 |

-continued

| Lens | Radii | Dimensions in Inches | | $N_D$ | V |
|---|---|---|---|---|---|
| | | Thickness | Spacing | | |
| | $R_8 = *R(5)$ | | | | |
| | | | $S_4 = .7500$ | | |
| $L_5$ | $R_9 = *R(6)$ | $T_5 = .1100$ | | 1.490 | 57.4 |
| | $R_{10} = *R(7)$ | | | | |
| | | | $S_5 = 1.6555$ | | |
| $L_6$ | $R_{11} = *R(8)$ | $T_6 = .1100$ | | 1.490 | 57.4 |
| | $R_{12} = *R(9)$ | | | | | wherein the first column lists the lens elements numerically starting at the ray entrance side of the system, the second column lists the respective radii and vertex radii of the aspheric surfaces *R(1) to *R(9), using the convention that the negative (−) values of the radii indicating surfaces which are concave and the positive (+) values of the radii indicating surfaces which are convex; the third column lists the thicknesses $T_1$ to $T_6$ of the respective elements; the fourth column lists the axial spacings $S_1$ to $S_5$ between the respective elements, and the fifth and sixth columns list respectively the refractive index $N_D$ and the dispersive index V of the respective elements.

5. An optical system of a chromatically neutral viewfinder system incorporating a substantially zero power doublet located near the position of an aperture stop in the system, the system having substantially the following specifications:

| Lens | Radii | Dimensions in Inches | | $N_D$ | V |
|---|---|---|---|---|---|
| | | Thickness | Spacing | | |
| $L_1$ | $R_1 = *R(1)$ | $T_1 = .1200$ | | 1.490 | 57.4 |
| | $R_2 = *R(2)$ | | | | |
| | | | $S_1 = 1.4020$ | | |
| $L_2$ | $R_3 = *R(3)$ | $T_2 = .1200$ | | 1.490 | 57.4 |
| | $R_4 = *R(4)$ | | | | |
| | | | $S_2 = .7520$ | | |
| $L_3$ | $R_5 = 4.7230$ | $T_3 = .0300$ | | 1.720 | 29.3 |
| | $R_6 = -.1898$ | | | | |
| | | | $S_3 = 0$ | | |
| $L_4$ | $R_7 = .1898$ | $T_4 = .1000$ | | 1.691 | 54.8 |
| | $R_8 = INF$ | | | | |
| | | | $S_4 = .7500$ | | |
| $L_5$ | $R_9 = *R(5)$ | $T_5 = .1100$ | | 1.490 | 57.4 |
| | $R_{10} = *R(6)$ | | | | |
| | | | $S_5 = 1.6555$ | | |
| $L_6$ | $R_{11} = *R(7)$ | $T_6 = .1100$ | | 1.490 | 57.4 |
| | $R_{12} = *R(8)$ | | | | | wherein the first column lists the lens elements numerically starting at the ray entrance side of the system, the second column lists the respective radii and vertex radii of the aspheric surfaces *R(1) to *R(8), using the convention that the negative (−) values of the radii indicating surfaces which are concave and the positive (+) values of the radii indicating surfaces which are convex; the third column lists the thicknesses $T_1$ to $T_6$ of the respective elements; the fourth column lists the axial spacings $S_1$ to $S_5$ between the respective elements, and the fifth and sixth columns list respectively the refractive index $N_D$ and the dispersive index V of the respective elements.

6. An optical system of a chromatically neutral viewfinder system incorporating a substantially zero power doublet located near the position of an aperture stop in the system, the system having substantially the following specifications:

| Lens | Radii | Dimensions in Inches | | $N_D$ | V |
|---|---|---|---|---|---|
| | | Thickness | Spacing | | |
| $L_1$ | $R_1 = *R(1)$ | $T_1 = .1200$ | | 1.490 | 57.4 |
| | $R_2 = *R(2)$ | | | | |
| | | | $S_1 = 1.4020$ | | |
| $L_2$ | $R_3 = *R(3)$ | $T_2 = .1200$ | | 1.490 | 57.4 |
| | $R_4 = *R(4)$ | | | | |
| | | | $S_2 = .7520$ | | |
| $L_3$ | $R_5 = 5.0000$ | $T_3 = .0300$ | | 1.592 | 30.4 |
| | $R_6 = 0.1763$ | | | | |
| | | | $S_3 = .0050$ | | |
| $L_4$ | $R_7 = .1763$ | $T_4 = .1000$ | | 1.490 | 57.4 |
| | $R_8 = *R(5)$ | | | | |
| | | | $S_4 = .7500$ | | |
| $L_5$ | $R_9 = *R(6)$ | $T_5 = .1100$ | | 1.490 | 57.4 |
| | $R_{10} = *R(7)$ | | | | |
| | | | $S_5 = 1.6555$ | | |
| $L_6$ | $R_{11} = *R(8)$ | $T_6 = .1100$ | | 1.490 | 57.4 |
| | $R_{12} = *R(9)$ | | | | | wherein the first column lists the lens elements numerically starting at the ray entrance side of the system, the second column lists the respective radii and vertex radii of the aspheric surfaces *R(1) to *R(9), using the convention that the negative (−) values of the radii indicating surfaces which are concave and the positive (+) values of the radii indicating surfaces which are convex; the third column lists the thicknesses $T_1$ to $T_6$ of the respective elements; the fourth column lists the axial spacings $S_1$ to $S_5$ between the respective elements, and the fifth and sixth columns list respectively the refractive index $N_D$ and the dispersive index V of the respective elements.

* * * * *

UNITED STATES PATENT OFFICE
CERTIFICATE OF CORRECTION

PATENT NO. : 4,086,000
DATED : April 25, 1978
INVENTOR(S) : Arthur Cox and Walter R. Linke It is certified that error appears in the above-identified patent and that said Letters Patent are hereby corrected as shown below:

Column 7, line 64, after "convex;", delete --and--.

Column 8, claim 3, change the equation "$R_9 = .1820$" to --$R_9 = -.1820$--.

Signed and Sealed this

Twenty-second Day of May 1979

[SEAL]

Attest:

RUTH C. MASON
Attesting Officer

DONALD W. BANNER
Commissioner of Patents and Trademarks